United States Patent Office 3,516,825

Patented June 23, 1970

3,516,825

SOLDER FOR SOLDERING OR BRAZING CAST IRON

Andrei Nikolaevich Shashkov, Lomonosovsky prospekt 23, kv. 550; Gnesa Abramovna Asinovskaya, Metrostroevskaya ulitsa 3/14, kv. 44; and Inna Ivanovna Ilina, Perovskaya ulitsa 51, kv. 20, all of Moscow, U.S.S.R.

No Drawing. Filed Dec. 21, 1967, Ser. No. 692,292

Int. Cl. C22c *9/02, 9/04, 9/06*

U.S. Cl. 75—134 1 Claim

ABSTRACT OF THE DISCLOSURE

A solder for soldering and brazing cast iron consisting of 48–50% Cu, 0.8–1.0% Sn, 9.5–10.5% Mn, 3.5–4.5% Ni, 0.15–0.25% Al and the remainder Zn.

The present invention relates to solders to be employed for soldering and brazing of cast iron.

The present invention may be used to the best advantage for repairing cast-iron articles and iron castings, which must cater to high requirements as to the uniformity of their color and mechanical properties.

Known in the prior art are solders for soldering and brazing cast iron. These solders are of the following composition: zinc, 38 to 50%; iron, 1%; tin, 1%; manganese, 0.5%, the rest being copper.

A disadvantage of all these solders is their color differing from that of cast iron (yellow color of brass) and a lower hardness than that of cast iron. Therefore, these solders cannot be employed for reparing articles that should meet high requirements as to their external appearance and mechanical properties.

An object of the invention is to provide such a solder for soldering and brazing cast iron, which will ensure, on completing the machining operation, obtaining of a soldered or brazed joint uniform as to its color.

Another object of the present invention is to provide a solder of the same type, which will ensure obtaining of a soldered or brazed joint uniform as to its mechanical properties.

A further important object of the present invention is to provide a solder of similar type, which will have a low melting point.

According to all the above-said and other objects, the proposed solder for soldering and brazing cast iron, containing copper, tin, manganese and zinc, in conformity with the invention, apart from the above-said elements contains also nickel and aluminium.

The most advantageous solution of the problem can be achieved owing to the fact that the above-said constituents are taken in the following proportions, in weight percent.

copper—48–50.0
tin—0.8–1.0
manganese—9.5–10.5
nickel—3.5–4.5
aluminium—0.15–0.25
zinc being the rest.

The proposed solder for soldering and brazing cast iron allows it to obtain a soldered or brazed joint uniform as to its color and mechanical properties.

The detailed description of exemplary embodiments of the present invention are given hereinbelow.

In conformity with the invention, the proposed solder contains the following constituents: copper, tin, manganese, nickel, aluminum and zinc. If in the solder be present the proportion of 9.5 to 10.5 manganese and 3.5 to 4.5 nickel, then in the brazed joint there are ensured the white color of the solder and built-up metal, as well as the hardness of the joint varying within a range of 170 to 190 Brinell hardness numbers. This white color of the joint is preserved only in its cast state; but after machining, owing to the oxidation of manganese, it acquires a rosy or pale pink color differing from that of the cast iron. An addition into the alloy of 1.15 to 0.25% aluminum protects the manganese against oxidation and thus ensures the preservation of the white color of the soldered or brazed joint even after the machining thereof.

Tin which is contained in the solder in the proportion from 0.8 to 1.0 increases the fluidity of the solder and ensures a good moistening of the cast iron at a relatively low temperature of the soldering process.

The proposed solder which possesses color and hardness approximating those of cast iron, makes it the indispensible and most economical material for repairing cast-iron articles and iron castings, which must meet high requirements as to their external appearance and mechanical properties. The low melting point of the solder allows the use of it for repairing defects on already machined surfaces of the articles without any deformation thereof.

Moreover, it should be noted that the low melting point of the proposed solder permits a decrease in the consumption of gases during the soldering and brazing processes and an increase in the productivity of these manufacturing processes.

Thus, the proposed solder allows the elimination of defects of cast-iron articles and iron castings, which could not be removed by the aid of the conventional solders.

EXAMPLE 1

Soldering or brazing of a defect in a grey-iron casting has been effected with the use of a solder having the following composition: copper, 48.9%; manganese, 10.1%; nickel, 3.9%; aluminium, 0.2%; tin, 0.98%; zinc being the rest.

The melting point of the solder or liquidus is equal to 847° C.

Preheating was effected by an oxy-acetylene flame.

It is most advantageous to carry out the process of soldering or brazing with the use of a flux of the following composition: boric acid ($H_3BO_3$)=50%; lithium carbonate ($Li_2CO_3$)=25%; and sodium carbonate ($Na_2CO_3$)=25% (see, for example, the patent of Federal Republic of Germany, No. 1,218,540; British Pat. No. 990,765; U.S. Pat. No. 3,179,540; French Pat. No. 1,367,-555). When using this flux, the working temperature of the soldering process, that is, the temperature of preheating cast iron at the place of soldering, does not exceed 750° C. As a result, the soldering process is effected without having recourse to a common preheating of cast iron, in which thereby are not observed neither chilled structures nor cracks forming. The process is successfully effected on already machined parts without any variation of their geometrical shape.

On completing machining, the soldered metal acquired the white color approximating that of the cast iron. The hardness of the soldered metal was found to be equal to 170 to 190 Brinell hardness numbers while the hardness of cast iron was equal to as high as 180 to 200 Brinell numbers. In the zone of the temperature action of the soldering and brazing process, no chilling structures nor cracks have been observed in the cast iron. The soldered or brazed joint readily responded to machining, milling, grinding and scraping.

EXAMPLE 2

A defect found in a grey-iron casting has been soldered with the use of a solder having the following composition: copper (Cu)=48.1%; manganese (Mn)=9.5%; nickel (Ni)=3.5%; aluminium (Al)=0.15%; tin (Sn)=0.9%; zinc (Zn) being the rest.

The flux, employed for carrying out the soldering or brazing process, had the above-said composition, namely; $H_3BO_3$=50%; $Li_2CO_3$=25%; $Na_2CO_3$=25%. The soldering or brazing process has been effected under conditions indicated for the Example No. 1.

On completing machining the built-up metal acquired the white color approximating that of the bast iron. The hardness of the built-up metal was found to be equal to 175 to 190 Brinell numbers.

EXAMPLE 3

A defect in a grey-iron casting has been soldered with the use of a solder having the following composition: copper (Cu)=50%; nickel (Ni)=4.4%; tin (SN)=1.1%; aluminium (Al)=0.25%; zinc (Zn) being the rest. The soldering and brazing process has been effected under conditions as indicated above.

On completing machining, the built-up metal acquired the white color and hardness of 170 to 180 Brinell numbers with the hardness of cast iron being equal to 170 to 200 Brinell numbers.

What is claimed is:

1. A solder for soldering or brazing cast iron, consisting of the following weight composition:

copper, 48 to 50.0%
tin, 0.8 to 1.0%
manganese, 9.5 to 10.5%
nickel, 3.5 to 4.5%
aluminium, 0.15 to 0.25%
zinc being the rest.

References Cited

UNITED STATES PATENTS

| | | | |
|---|---|---|---|
| 1,457,289 | 5/1923 | Ostendorf | 75—157.5 |
| 1,907,219 | 5/1933 | Sieg | 75—157.5 |
| 2,400,234 | 5/1946 | Hudson | 75—157.5 |
| 2,931,098 | 4/1960 | Johnson | 75—157.5 X |
| 3,297,437 | 1/1967 | Bosman | 75—157.5 |

CHARLES N. LOVELL, Primary Examiner

U.S. Cl. X.R.

75—153, 157, 178